Oct. 10, 1950 E. M. DELORAINE 2,524,776

PULSE TIME MODULATION REPEATER SYSTEM

Filed July 2, 1947

INVENTOR.
EDMOND M. DELORAINE

BY Robert Harding Jr.
ATTORNEY

Patented Oct. 10, 1950 2,524,776

UNITED STATES PATENT OFFICE 2,524,776

PULSE TIME MODULATION REPEATER SYSTEM

Edmond Maurice Deloraine, New York, N. Y., assignor to Federal Telephone and Radio Corporation, New York, N. Y., a corporation of Delaware Application July 2, 1947, Serial No. 758,517

3 Claims. (Cl. 250—15)

This invention relates to multi-link communication systems and more particularly to repeaters for use with such systems which act to receive and to re-modulate locally produced pulses for retransmission to given multi-channel pulse terminals.

In multiple link systems utilizing pulse time modulations multiplex for communication between terminal stations and with branch stations which may be located on mobile equipment, it is often desired to provide means for suitably timing the signals received from the mobile equipment so that they will be spaced properly in the multiplex channel of such a link. In such multi-link systems certain other repeaters may be provided for inbranching channels from such mobile equipment. Such a system has been proposed wherein the energy from the mobile equipment is demodulated and filtered to reproduce the original audio envelope and this is then used at the repeater station to remodulate pulses in a proper time position to fit within the time channel area.

It is an object of the present invention to provide multi-link communication systems wherein signals from stations out-side of fixed terminals are used to re-modulate locally produced energy for transmission toward fixed terminals.

Another object of the invention is to provide a repeater-remodulator for use with a multi-link system which is effective by means of partial demodulation of the signals which are to be retransmitted.

In accordance with the present invention a demodulating system is provided which does not require that the energy be completely demodulated and filtered to produce the original audio envelope but where instead the energy may be reduced to voltage measurements proportional to the modulation signal which voltages may then be used in a proper timing relationship to modulate pulses for insertion in a train of multiplex pulses. This may be accomplished by producing pulses having amplitude variations corresponding to the time displacement signals. These audio amplitude signals may then be stored in a storage means such as a condenser where they will be maintained at this level substantially indefinitely. Each succeeding impulse serves to vary the voltage charge on the condenser in accordance with the time displacement or signal amplitude and the voltage thus provided may be used to produce the desired modulation at the proper level during a period when a pulse appears in a multiplex channel.

Figure 1:
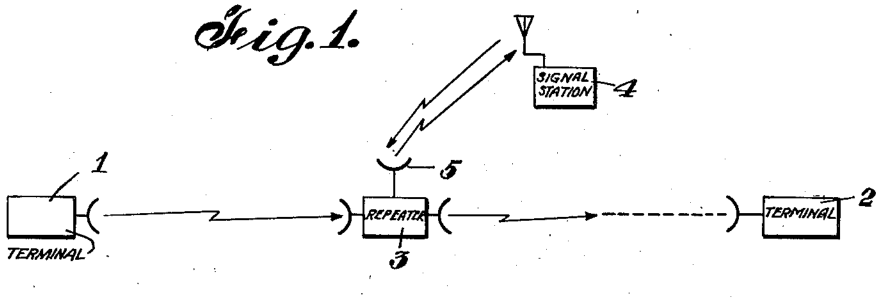
Figure 2:
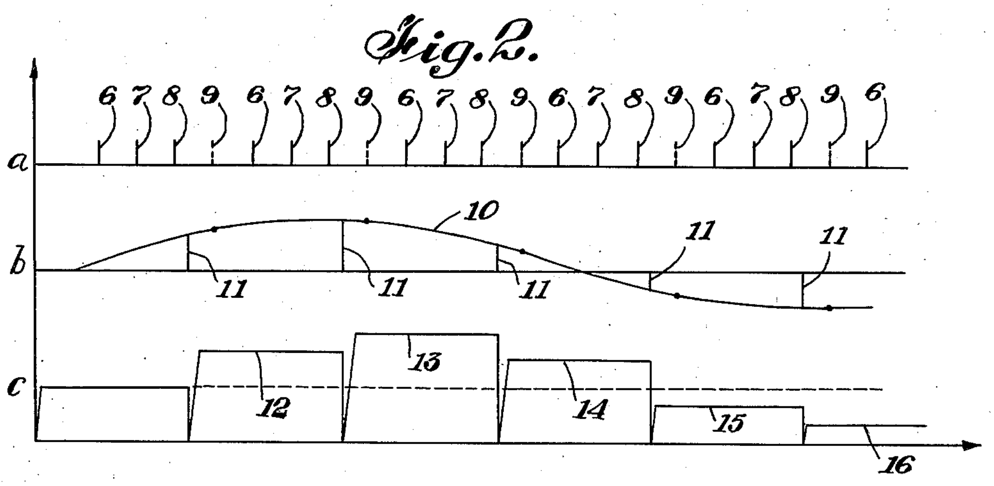
Figure 3:
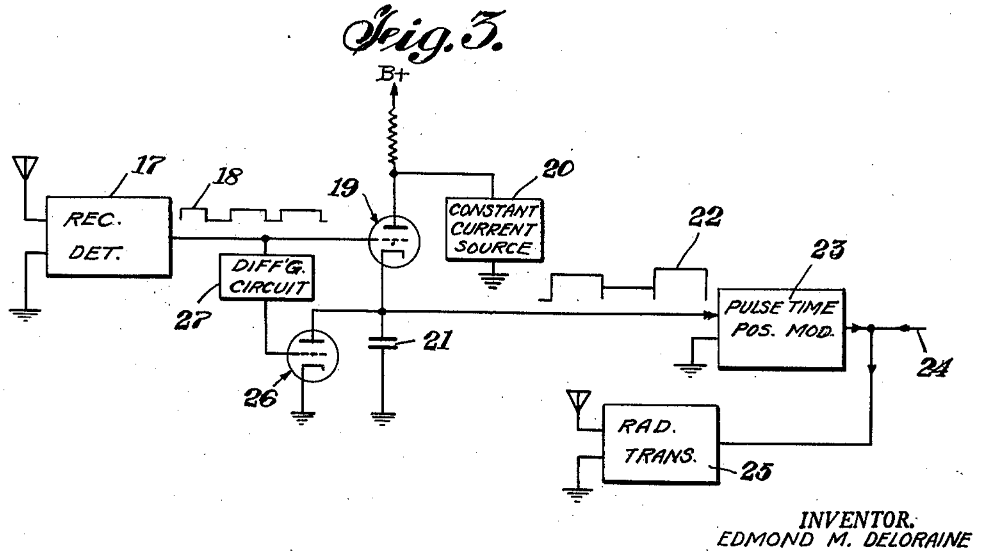

Further objects and features of this invention will become more apparent, and the invention itself, though not necessarily defined by the said features and objects, will be best understood by reference to the following description of an embodiment of the invention taken in connection with the accompanying drawings, wherein:

Fig. 1 illustrates in general the type of multi-link station to which a demodulator in accordance with this invention may be applied, Fig. 2 represents a set of curves illustrating the general principle of this invention, and Fig. 3 is a circuit diagram partially in block form illustrating a preferred demodulator circuit in accordance with this invention.

Referring to the drawings, in accordance with the showing in Fig. 1, one terminal which may be termed the west terminal is indicated at 1, while an east terminal is indicated at 2. Intermediate these terminals may be provided one or more repeaters such as shown at 3 which will serve for repeating signals from either of the terminals to the other one. A separate communication equipment which may be mounted on mobile apparatus, for example, is shown at 4. Signals from apparatus 4 may be transmitted into a branching antenna 5 at a repeater such as 3 so that the signals thereof may be impressed on the multiplex link between stations 1 and 2.

Referring to Fig. 2, curve *a* represents a multichannel pulse system comprising pulses of 3 channels 6, 7 and 8 provided with a normal gap intermediate channels 8 and 6 for the insertion of another channel. Pulses shown in dotted lines at 9 may comprise signals received from mobile station 4 and inserted in the channel at some repeater such as shown at 3. In curve *b* the envelope 10 represents, for example, the audio signal received and demodulated at 3. Instead of complete demodulation to produce envelope 10, the modulation may take place by only converting the pulses such as pulses 9 into pulses 11 of amplitude or energy content varying in accordance with the modulation envelope. Curve *c* illustrates the voltage produced in a storage condenser in response to pulses 11 of curve *b*. It will thus be seen that the signal voltage rises to a level 12 in response to the first pulse 11, to a higher level 13 in response to a succeeding pulse, then down to level 14, then to level 15 and then on down to level 16 in response to the following pulses 11 of curve *b*. It will therefore be seen that the voltage produced in response to the pulses of various levels is preserved for a period of time sufficient to produce suitable modulation of the intermediate pulse 9 referred to.

Referring to Fig. 3, a receiver is represented at 17 which may receive energy from a radio transmitter such as shown at 4 and detect this energy. The receiver 17 may also include apparatus to produce from the received pulses output pulses as shown at 18 having a width or time duration and this energy content dependent upon the time position of the pulses received. These pulses may be applied to a tube 19 to render this tube conductive so that energy from a constant current source 20 may flow through the tube into a condenser 21 to charge the same. Condenser 21 is preferably made sufficiently large so that it will not become fully charged during a period of time represented by the pulse duration of the widest pulse in train 18. Thus the tube 19 and storage condenser 21 serve to produce voltage charges in the condenser proportional to the time duration of the pulses 18. It will therefore be seen that this circuit has served to translate the time difference or time duration of pulses 18 into amplitude variations and will serve to store these amplitude varied signals for substantially an indefinite period. In order that each charge may be proportional to the energy of the succeeding pulses, means described later, is provided to discharge the condenser momentarily, just prior to application of each new pulse. Thus in the output of this circuit the wave 18 may be translated into a variable amplitude square wave as illustrated generally at 22. This wave may then be used if desired to modulate the time position of a series of pulses in the modulator 23 so that they will be properly interspersed with respect to a train of pulses such as shown in Fig. 2. These pulses may then be used in common with the other incoming pulses coming in over line 24 to modulate a radio transmitter 25 for the transmission of a multiple pulse series. In order that condenser 21 may be caused to build up from substantially zero voltage to the desired amplitude level in response to each succeeding incoming signal a circuit is provided to discharge condenser 21 immediately upon the receipt of each successive pulse of pulse train 18. To this end a tube 26 is bridged across condenser 21, the tube normally being biased to cut out so as to provide substantially an open circuit. The pulses 18 are branched through a differentiating circuit 27 to produce very short positive pulses representing the leading edge of each applied pulse. These positive pulses serve to trigger tube 26 rendering it conductive so as effectively to short circuit condenser 21 in response to each received pulse. Because of the differentiation the triggering pulse on 26 is extremely short in duration and will serve to discharge the condenser and then will present substantially an open circuit so that the condenser may be charged for the remainder of the pulse as described above.

It will be clear that while I have illustrated this demodulating circuit for the purpose of remodulating a signal for further transmission, that it need not be used for this purpose but can be used as a new form of demodulator if desired so that if followed by a filter the ideal envelope of the original signal will be substantially reproduced. However, for retransmission this system presents a demodulator which will be of greater efficiency than the type with complete demodulation and filtering provided prior to retransmission of the signals.

While I have described above said features and objects of my invention in connection with specific apparatus, it is to be clearly understood that this description is made only by way of example and not as a limitation of the scope of my invention.

What is claimed is:

1. A method of communication in a multi-link radio communication system having associated terminals at spatially different locations, responding branch stations, and a repeater station intermediate said terminals for inbranching pulse communication channels from said branch stations comprising transmitting from at least one of said branch stations time displaced pulses each of whose displacement corresponds to the amplitude value of an inbranching signal intelligence wave at a separate given point thereof, translating at the repeater each of the time displaced pulses into energy which likewise corresponds to the amplitude value of said intelligence wave at said given point and storing this energy, translating the stored energy into a second series of time displaced pulses, each of whose displacement likewise corresponds to said amplitude value at said point and inserting said second series of pulses in predetermined positions in the signal being transmitted from one terminal to the other.

2. A multi-link radio communication system comprising associated communicating terminals at spatially different locations, responding branch stations, a repeater station intermediate said terminals for inbranching pulse communication channels from said branch stations, means located at at least one of said branch stations for transmitting time displaced pulses each of whose displacement corresponds to the amplitude value of an inbranching signal intelligence wave at a separate given point thereof, means at the repeater for retranslating each of the time displaced pulses into energy which corresponds in value likewise to said amplitude value of said wave at said point, means for storing said energy, means for translating the stored energy into a second series of time displaced pulses each of whose displacement likewise corresponds to said amplitude value at said point and means for inserting the pulses of said second series in predetermined positions in the signal being transmitted from one terminal to the other.

3. A system according to claim 2 wherein said repeater includes an energy storage means, a circuit responsive to each successive time modulated pulse, for applying energy proportional to the time modulation of said pulse to said storage means, whereby the envelope of the energy successively stored will approximately simulate the given signal envelope, means providing a series of pulses, and means for modulating the relative time position of said provided pulses in accordance with said envelope.

EDMOND MAURICE DELORAINE.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,155,821 | Goldsmith | Apr. 25, 1939 |
| 2,283,415 | Cox | May 19, 1942 |
| 2,294,863 | Hadfield | Sept. 1, 1942 |
| 2,419,340 | Easton | Apr. 22, 1947 |
| 2,421,017 | Deloraine et al. | May 27, 1947 |
| 2,421,727 | Thompson | June 3, 1947 |
| 2,425,066 | Labin et al. | Aug. 5, 1947 |